US009726529B2

(12) United States Patent
Mansfield et al.

(10) Patent No.: US 9,726,529 B2
(45) Date of Patent: Aug. 8, 2017

(54) FEED-THROUGH

(71) Applicant: Micro Motion, Inc., Boulder, CO (US)

(72) Inventors: William M Mansfield, Niwot, CO (US); Shaun E Shanahan, Denver, CO (US); Howard Irving Sohm, Jr., Longmont, CO (US)

(73) Assignee: Micro Motion, Inc., Boulder, CO (US)

( * ) Notice: Subject to any disclaimer, the term of this patent is extended or adjusted under 35 U.S.C. 154(b) by 230 days.

(21) Appl. No.: 14/646,054

(22) PCT Filed: Dec. 12, 2012

(86) PCT No.: PCT/US2012/069240
§ 371 (c)(1),
(2) Date: May 20, 2015

(87) PCT Pub. No.: WO2014/092701
PCT Pub. Date: Jun. 19, 2014

(65) Prior Publication Data
US 2015/0292930 A1    Oct. 15, 2015

(51) Int. Cl.
*G01F 1/84* (2006.01)
*G01F 15/18* (2006.01)
*H01B 13/00* (2006.01)
*H01B 17/26* (2006.01)

(52) U.S. Cl.
CPC .......... *G01F 1/8413* (2013.01); *G01F 1/8409* (2013.01); *G01F 1/8431* (2013.01); *G01F 15/185* (2013.01); *H01B 13/0003* (2013.01); *H01B 17/265* (2013.01)

(58) Field of Classification Search
USPC .......................... 174/650, 660, 64
See application file for complete search history.

(56) References Cited

U.S. PATENT DOCUMENTS

| 4,536,613 | A | * | 8/1985 | Gallas | H02G 3/0683 |
| | | | | | 174/660 |
| 5,026,302 | A | | 6/1991 | Spencer | |
| 5,399,807 | A | | 3/1995 | Yarbrough et al. | |
| 5,408,740 | A | * | 4/1995 | Dee | H01B 19/00 |
| | | | | | 174/152 R |

(Continued)

FOREIGN PATENT DOCUMENTS

| WO | 0047957 A1 | 8/2000 |
| WO | 2007097690 A1 | 8/2007 |

OTHER PUBLICATIONS

"Electrical & Optical Ceramic-TO-metal Componenets for Vacuum Science & Technology" Insulator Seal 2001 [retrieved on Sep. 30, 2016] Retrieved from <https://web.archive.org/web/woo40831074052/http://insulatorseal.com/>.

*Primary Examiner* — Dhirubhai R Patel
(74) *Attorney, Agent, or Firm* — The Ollila Law Group LLC

(57) ABSTRACT

A feed-through (300) is provided according to the invention. The feed-through (300) includes a body (305) including a passage (320), a plug (325) located in and substantially blocking the passage (320), one or more conductors (328) extending through the plug (325), and a reduced diameter region (313) located on an exterior surface of the body (305), with the reduced diameter region (313) being adapted to receive ends of one or more projecting fasteners (330) of a second component.

20 Claims, 5 Drawing Sheets

(56) References Cited

U.S. PATENT DOCUMENTS

| | | |
|---|---|---|
| 7,745,725 B2 | 6/2010 | Paterek et al. |
| 2009/0158953 A1 | 6/2009 | Magne et al. |
| 2011/0317390 A1 | 12/2011 | Moser et al. |

\* cited by examiner

FEED-THROUGH

BACKGROUND OF THE INVENTION

1. Field of the Invention

The present invention relates to a feed-through, and more particularly, to a feed-through that additionally functions as a retainer.

2. Statement of the Problem

Vibrating conduit sensors, such as Coriolis mass flowmeters and vibrating densitometers, typically operate by detecting motion of a vibrating conduit that contains a flowing material. Properties associated with the material in the conduit, such as mass flow, density and the like, can be determined by processing measurement signals received from motion transducers associated with the conduit. The vibration modes of the vibrating material-filled system generally are affected by the combined mass, stiffness and damping characteristics of the containing conduit and the material contained therein.

A typical Coriolis mass flowmeter includes one or more conduits that are connected inline in a pipeline or other transport system and convey material, e.g., fluids, slurries, emulsions, and the like, in the system. Each conduit may be viewed as having a set of natural vibration modes, including for example, simple bending, torsional, radial, and coupled modes. In a typical Coriolis mass flow measurement application, a conduit is excited in one or more vibration modes as a material flows through the conduit, and motion of the conduit is measured at points spaced along the conduit. Excitation is typically provided by an actuator, e.g., an electromechanical device, such as a voice coil-type driver, that perturbs the conduit in a periodic fashion. Mass flow rate may be determined by measuring time delay or phase differences between motions at the transducer locations. Two such transducers (or pickoff sensors) are typically employed in order to measure a vibrational response of the flow conduit or conduits, and are typically located at positions upstream and downstream of the actuator. The two pickoff sensors are connected to electronic instrumentation. The instrumentation receives signals from the two pickoff sensors and processes the signals in order to derive a mass flow rate measurement, among other things. Vibratory flowmeters, including Coriolis mass flowmeters and densitometers, therefore employ one or more flow tubes that are vibrated in order to measure a fluid.

In some environments, electrical signals may need to be conducted through a flameproof physical barrier or housing. For example, a housing may surround and enclose electrical circuits of a meter electronics or transmitter. Alternatively, a barrier may separate compartments within a fieldmount transmitter housing. Process control transmitters designed for use in hazardous atmospheres often utilize a combination of protection methods, including flameproof housings and/or barriers, to avoid uncontrolled explosions of flammable gases. International standards define the compliance requirements for flameproof devices and structures.

In the case of Coriolis flowmeter transmitters, it is well known to enclose the active electronics components within a flameproof compartment, so that an explosion of gases that might occur as a result of electrical energy within the electronics will not propagate beyond the enclosure. In order to provide electrical connectivity between the compartments or regions, a flameproof and/or explosion-proof feed-through may be employed.

Aspects of the Invention

In one aspect of the invention, a feed-through comprises:
a body including a passage;
a plug located in and substantially blocking the passage;
one or more conductors extending through the plug; and
a reduced diameter region located on an exterior surface of the body, with the reduced diameter region being adapted to receive ends of one or more projecting fasteners of a second component.

Preferably, the feed-through is configured to be removably or permanently affixed to a first component and wherein the feed-through couples the second component to the first component.

Preferably, the one or more projecting fasteners of the second component engage the reduced diameter region in order to pull the second component into full engagement with the feed-through.

Preferably, the reduced diameter portion includes at least one substantially vertical sidewall.

Preferably, the reduced diameter portion includes at least one angled sidewall.

Preferably, the reduced diameter portion includes at least one angled sidewall and wherein the one or more projecting fasteners engage the at least one angled sidewall, with the at least one angled sidewall generating an engagement force on the second component when the one or more projecting fasteners are manipulated to project into the reduced diameter portion.

Preferably, the reduced diameter portion includes at least one angled sidewall including a sidewall angle that substantially matches a tip angle of the one or more projecting fasteners.

Preferably, the plug is formed of one or both of an electrical insulator material or a thermally-resistant material.

Preferably, the feed-through further comprises a first flange portion located on the exterior surface of the body, wherein the reduced diameter region is smaller than the first flange portion, and a second flange portion located on the exterior surface and located across the reduced diameter region from the first flange portion.

Preferably, the feed-through operates to pull the second component down and into frictional contact with the second flange portion of the feed-through.

In one aspect of the invention, a method of forming a feed-through comprises:
providing a body including a passage;
providing a plug located in and substantially blocking the passage;
providing one or more conductors extending through the plug; and
providing a reduced diameter region located on an exterior surface of the body, with the reduced diameter region being adapted to receive ends of one or more projecting fasteners of a second component.

Preferably, the method further comprises removably or permanently affixing the feed-through to a first component.

Preferably, the method further comprises removably or permanently affixing the feed-through to a first component and coupling the second component to the first component with the feed-through.

Preferably, the method further comprises removably or permanently affixing the feed-through to a first component and coupling the second component to the first component with the feed-through, wherein the one or more projecting fasteners of the second component engage the reduced diameter region in order to pull the second component into full engagement with the feed-through.

Preferably, the reduced diameter portion includes at least one substantially vertical sidewall.

Preferably, the reduced diameter portion includes at least one angled sidewall.

Preferably, the reduced diameter portion includes at least one angled sidewall and wherein the one or more projecting fasteners engage the at least one angled sidewall, with the at least one angled sidewall generating an engagement force on the second component when the one or more projecting fasteners are manipulated to project into the reduced diameter portion.

Preferably, the reduced diameter portion includes at least one angled sidewall including a sidewall angle that substantially matches a tip angle of the one or more projecting fasteners.

Preferably, the method further comprises providing a first flange portion located on the exterior surface of the body, wherein the reduced diameter region is smaller than the first flange portion and providing a second flange portion located on the exterior surface and located across the reduced diameter region from the first flange portion.

Preferably, the feed-through operates to pull the second component down and into frictional contact with the second flange portion of the feed-through.

DESCRIPTION OF THE DRAWINGS

The same reference number represents the same element on all drawings. The drawings are not necessarily to scale.

DETAILED DESCRIPTION OF THE INVENTION

FIGS. 1-5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
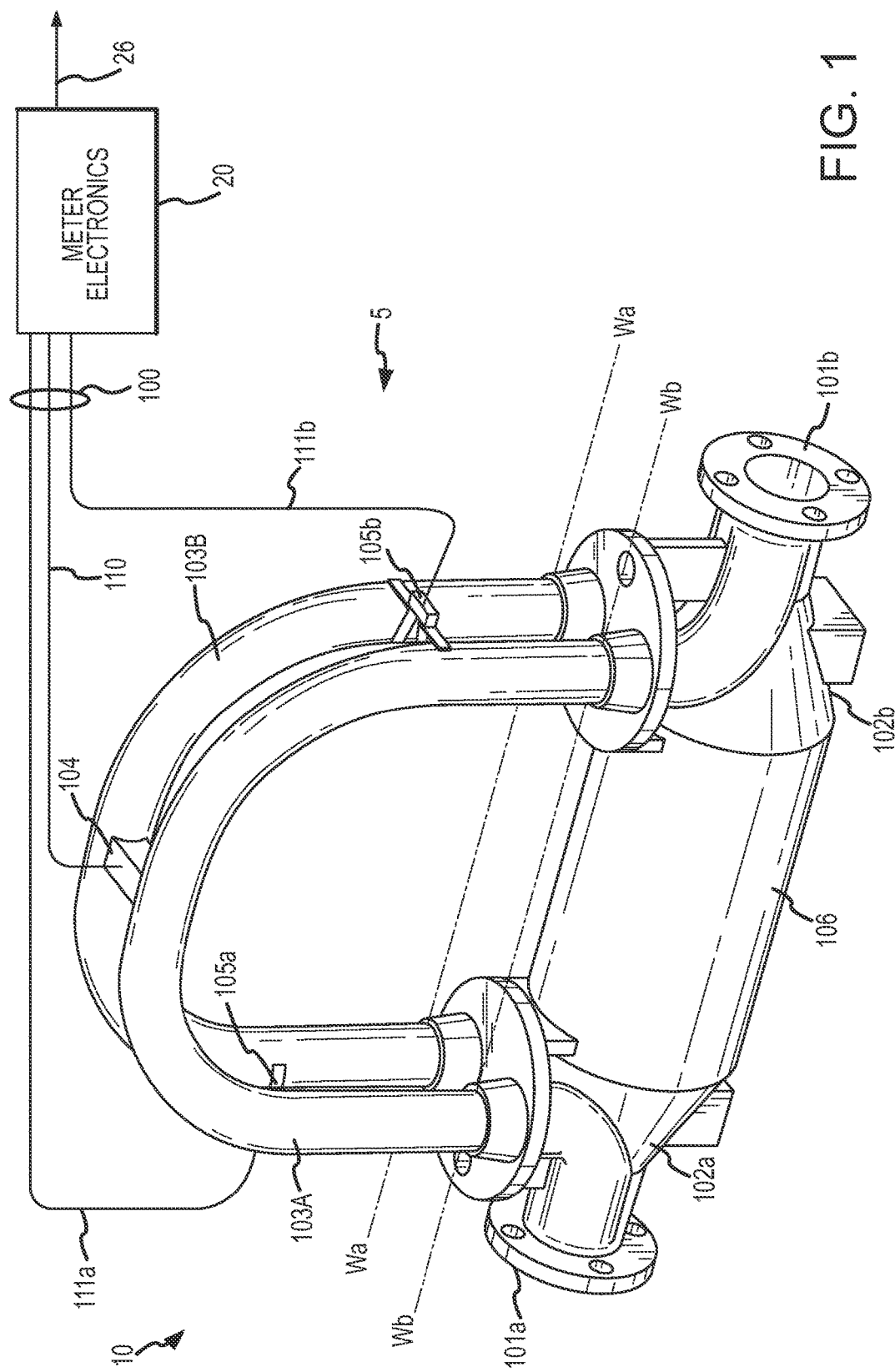
FIG. 1 shows a vibratory flowmeter according to the invention.

FIG. 1 shows a vibratory flowmeter 5 according to the invention. The vibratory flowmeter 5 comprises a flowmeter assembly 10 and meter electronics 20. The meter electronics 20 is connected to the meter assembly 10 via leads 100 and is configured to provide measurements of one or more of a density, mass flow rate, volume flow rate, totalized mass flow, temperature, or other measurements or information over a communication path 26. It should be apparent to those skilled in the art that the vibratory flowmeter 5 can comprise any manner of vibratory flowmeter, regardless of the number of drivers, pick-off sensors, flow conduits, or the operating mode of vibration. In some embodiments, the vibratory flowmeter 5 can comprise a Coriolis mass flowmeter. In addition, it should be recognized that the vibratory flowmeter 5 can alternatively comprise a vibratory densitometer.

The flowmeter assembly 10 includes a pair of flanges 101a and 101b, manifolds 102a and 102b, a driver 104, pick-off sensors 105a and 105b, and flow conduits 103A and 103B. The driver 104 and the pick-off sensors 105a and 105b are connected to the flow conduits 103A and 103B.

The flanges 101a and 101b are affixed to the manifolds 102a and 102b. The manifolds 102a and 102b can be affixed to opposite ends of a spacer 106 in some embodiments. The spacer 106 maintains the spacing between the manifolds 102a and 102b in order to prevent pipeline forces from being transmitted to flow conduits 103A and 103B. When the flowmeter assembly 10 is inserted into a pipeline (not shown) which carries the flow fluid being measured, the flow fluid enters the flowmeter assembly 10 through the flange 101a, passes through the inlet manifold 102a where the total amount of flow fluid is directed to enter the flow conduits 103A and 103B, flows through the flow conduits 103A and 103B and back into the outlet manifold 102b, where it exits the meter assembly 10 through the flange 101b.

The flow fluid can comprise a liquid. The flow fluid can comprise a gas. The flow fluid can comprise a multi-phase fluid, such as a liquid including entrained gases and/or entrained solids.

The flow conduits 103A and 103B are selected and appropriately mounted to the inlet manifold 102a and to the outlet manifold 102b so as to have substantially the same mass distribution, moments of inertia, and elastic modules about the bending axes Wa-Wa and Wb-Wb respectively. The flow conduits 103A and 103B extend outwardly from the manifolds 102a and 102b in an essentially parallel fashion.

The flow conduits 103A and 103B are driven by the driver 104 in opposite directions about the respective bending axes Wa and Wb and at what is termed the first out of phase bending mode of the vibratory flowmeter 5. The driver 104 may comprise one of many well known arrangements, such as a magnet mounted to the flow conduit 103A and an opposing coil mounted to flow conduit 103B. An alternating current is passed through the opposing coil to cause both conduits to oscillate. A suitable drive signal is applied by the meter electronics 20 to the driver 104 via the lead 110. Other driver devices are contemplated and are within the scope of the description and claims.

The meter electronics 20 receives sensor signals on the leads 111a and 111b, respectively. The meter electronics 20 produces a drive signal on the lead 110 which causes the driver 104 to oscillate the flow conduits 103A and 103B. Other sensor devices are contemplated and are within the scope of the description and claims.

The meter electronics 20 processes the left and right velocity signals from the pick-off sensors 105a and 105b in order to compute a flow rate, among other things. The communication path 26 provides an input and an output means that allows the meter electronics 20 to interface with an operator or with other electronic systems. The description of FIG. 1 is provided merely as an example of the operation of a Coriolis flowmeter and is not intended to limit the teaching of the present invention.

The meter electronics 20 in one embodiment is configured to vibrate the flowtubes 103A and 103B. The vibration is performed by the driver 104. The meter electronics 20 further receives resulting vibrational signals from the pickoff sensors 105a and 105b. The vibrational signals comprise vibrational responses of the flowtubes 103A and 103B. The meter electronics 20 processes the vibrational responses and determines a response frequency and/or phase difference. The meter electronics 20 processes the vibrational response and determines one or more flow measurements, including a mass flow rate and/or density of the flow fluid. Other vibrational response characteristics and/or flow measurements are contemplated and are within the scope of the description and claims.

In one embodiment, the flowtubes 103A and 103B comprise substantially U-shaped flowtubes, as shown. Alternatively, in other embodiments, the flowtubes can comprise substantially straight flowtubes or can comprise one or more flowtubes of curved shapes other than U-shaped flowtubes. Additional flowmeter shapes and/or configurations can be used and are within the scope of the description and claims.

Figure 2:
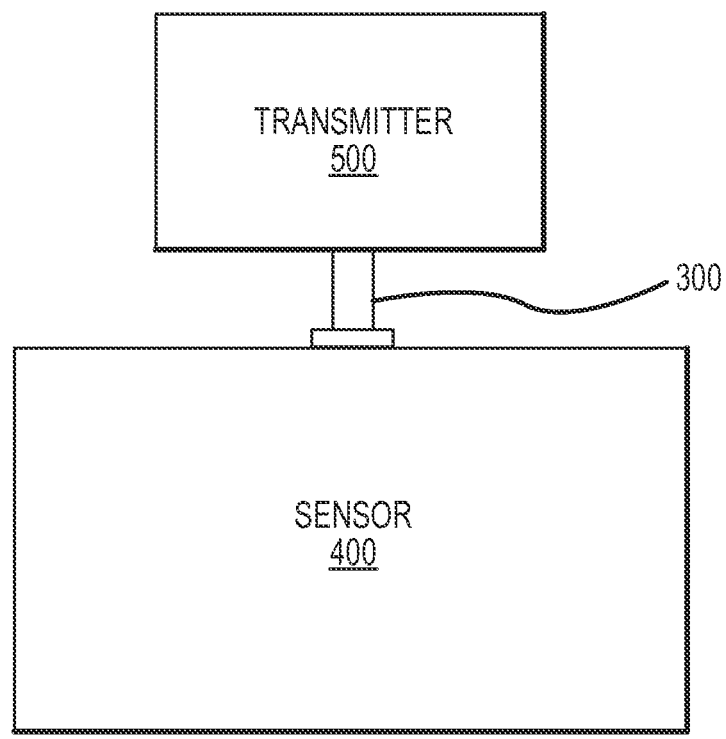
FIG. 2 shows a transmitter affixed to a sensor by a feed-through according to an embodiment of the invention.

FIG. 2 shows a transmitter 500 affixed to a sensor 400 by a feed-through 300 according to an embodiment of the invention. The sensor 400 may comprise or include a vibratory flowmeter 5 in some embodiments. The feed-through 300 may allow the transmitter 500 to rotate with respect to the sensor 400 or may allow the transmitter 500 to be positioned with respect to the sensor 400. In addition to affixing the transmitter 500 to the sensor 400, the feed-through 300 may serve as a channel or conduit for wires to pass between the transmitter 500 and the sensor 400. However, the feed-through 300 is not merely an open conduit and instead seals around any wires or conductors that extend through the feed-through 300. Consequently, the feed-through 300 does not allow gasses, liquids, or other materials to pass either out of or into the housing 200.

It should be understood that the feed-through 300 as shown in the figure is given merely as an example. It should be understood that the feed-through 300 can be positioned at other locations on the transmitter 500 and/or sensor 400. Further, the feed-through 300 according to any embodiment of the invention is not limited to use with a vibratory flowmeter or flowmeter transmitter. The feed-through 300 may be used with any barrier, housing, or device where a feed-through is needed. Further, the feed-through 300 may be used with any barrier, housing, or device where a flameproof and/or explosion-proof feed-through is needed.

Figure 3:
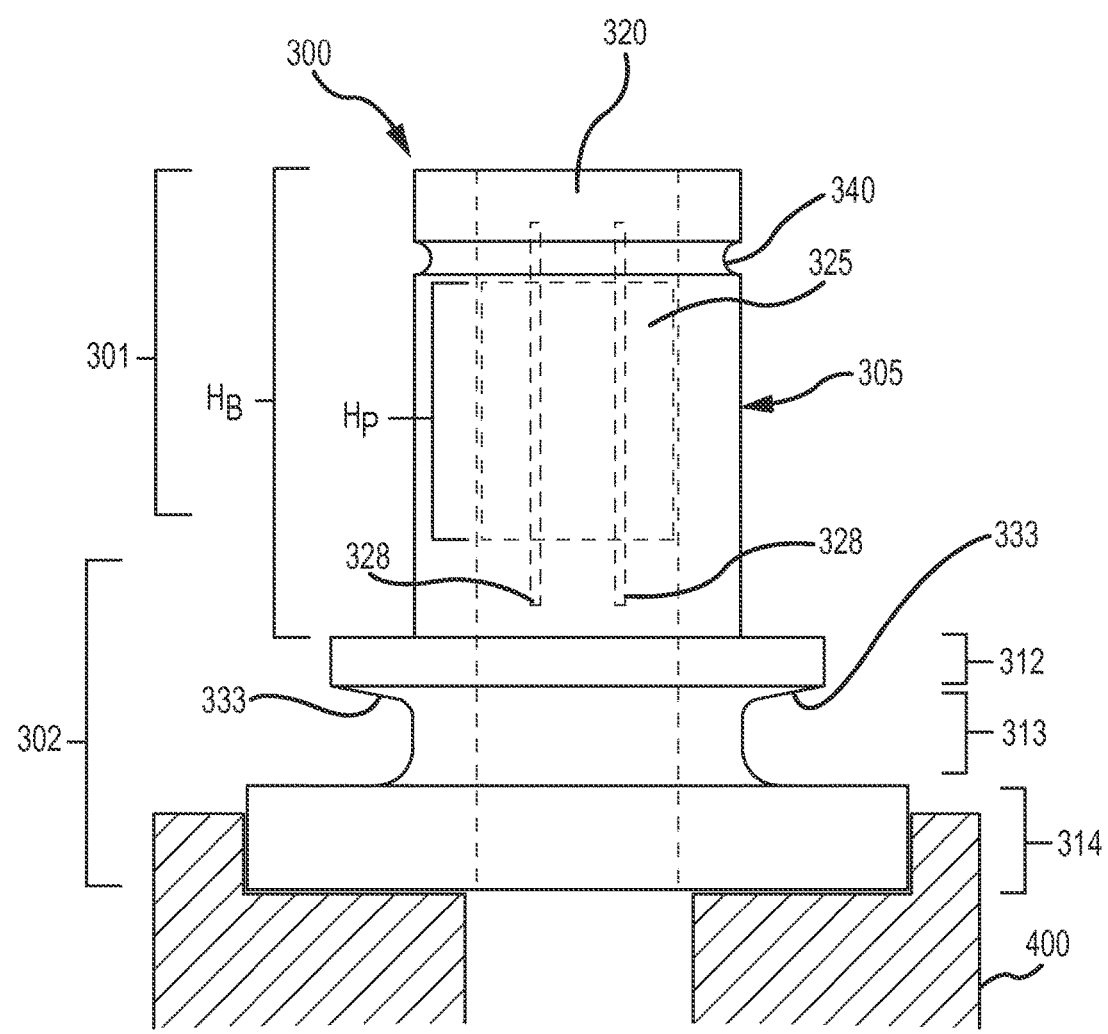
FIG. 3 shows a feed-through according to an embodiment of the invention.

FIG. 3 shows a feed-through 300 according to an embodiment of the invention. The feed-through 300 may be permanently or removably attached to the first component 400, such as the sensor or vibratory sensor 400. In addition, the feed-through 300 is configured to be removably and positionably affixed to a second component 500, such as the transmitter 500. The second component 500 may be removably affixed to the feed-through 300, wherein the second component can rotate or can be rotatably positioned with respect to the feed-through 300. The second component or structure may be selectively rotated with respect to the first component 400 via the feed-through 300.

The feed-through 300 creates an attachment interface with the second component 500. The feed-through 300 creates a rotatable attachment interface with the second component 500. For example, the feed-through 300 can be used to mount a transmitter of a Coriolis flowmeter to a flowmeter assembly or housing in some applications. However, it should be understood that other uses and applications of the feed-through 300 are contemplated and are within the scope of the description and claims.

The feed-through 300 may be permanent or removably affixed to the first component 400. The feed-through 300 may be affixed to the first component 400 in any suitable manner. The feed-through 300 may be received in a receptacle or may extend into or through an aperture in the first component 400 in some embodiments.

The feed-through 300 comprises an electrical feed-through that permits the exchange of electrical signals and/or electrical power. The feed-through 300 permits electrical signals to be exchanged between the first component 400 and the second component 500. However, the feed-through 300 does not permit gasses, liquids, or other materials to pass between the first component 400 and the second component 500.

The feed-through 300 comprises a flameproof feed-through in some embodiments. Consequently, the feed-through 300 may be designed to conform to applicable flameproof standards. In a flameproof embodiment, a flame is not permitted to pass through the feed-through 300. As a result, ignition on one side of the feed-through 300 does not result in ignition on the other side of the feed-through 300.

The feed-through 300 comprises an explosion-proof feed-through in some embodiments. The feed-through 300 may be designed to conform to applicable explosion-proof standards. In an explosion-proof embodiment, the feed-through 300 does not allow passage of gas, liquid, or other materials in the event of an explosion on either side of the feed-through 300. The feed-through 300 may be constructed to contain a pressure spike up to a predetermined pressure threshold.

The feed-through 300 includes a body 305 including a proximal end 301 and a distal end 302. The body 305 may be substantially cylindrical in some embodiments, but it should be understood that other cross-sectional shapes may be used. A seal groove 340 may be formed in the exterior surface of the body 305 and may be configured to receive a seal 346 (see FIG. 4). It should be understood that the seal groove 340 may be located at any desired position on the body 305.

The feed-through 300 includes a passage 320 that extends through the body 305. The passage 320 may be uniform or may have portions of different shapes and/or diameters. The passage 320 may be straight or may include turns or bends.

A plug 325 is formed in the passage 320. The plug 325 may be formed of an electrical insulator material and/or formed of a thermally-resistant material. The plug 325 may comprise a non-flammable or flame or heat-resistant material. The plug 325 substantially blocks the passage 320. As a result, any gaps between the plug 325 and the interior surface of the passage 320 are of a gap depth and/or gap length that is less than a depth and length that will allow a flame to pass through the passage 320. In some embodiments, therefore, the gap depth and gap length conform to applicable flameproof standards.

In one embodiment, the plug 325 is formed of glass. In some embodiments, the plug 325 is formed of fused glass. Where the plug 325 is formed of fused glass, the glass may be inserted into the passage 320 in a liquid or semi-liquid state and allowed to cool, wherein the glass plug 325 substantially conforms to the interior surface of the passage 320. As a result, a gap between the plug 325 and the interior surface of the passage 320 will be minimized. As a result, the gap between the plug 325 and the interior surface of the passage 320 will be minimal enough so that the feed-through 300 will be one or both of flameproof or explosion-proof.

In some embodiments, the glass plug 325 may be heated in position in the passage 320 until the glass plug 325 softens and flows to conform to the inner surface of the passage 320. The feed-through 300 is then allowed to cool, wherein the glass plug 325 may decrease in volume less than the body 305, wherein a compression force is placed on the plug 325 by the body 305. As a result, the plug 325 may be securely held in place. Further, the compression force may form a substantially hermetic seal. As a result, the compression force may enable the feed-through 300 to withstand a high gas pressure and meet explosion-proof requirements.

It is desired that gaps do not exist between the plug 325 and the body 305, or at least are less than a predetermined maximum gap threshold. Gaps may allow ignition products to propagate through the feed-through 300.

A flame path between the plug 325 and the interior surface of the passage 320 will depend on both a gap depth and a flame path length. Compliance with a flame proof standard may require maintaining a small gap depth, a long flame path length, or both.

The plug 325 is formed so that there is a minimal gap depth between the plug 325 and the interior surface of the passage 320. The plug 325 is formed so that a gap depth between the plug 325 and the interior surface of the passage 320 is less than a predetermined maximum gap threshold. The predetermined maximum gap threshold may comprise a gap depth that is prescribed by an applicable flameproof standard. The predetermined maximum gap threshold may comprise a gap depth that is prescribed by an applicable explosion-proof standard.

The plug 325 may have a plug height $H_P$ that exceeds a predetermined minimum flame path length. The plug height $H_P$ may be designed to exceed a predetermined minimum flame path length that is prescribed by an applicable flameproof standard. The plug height $H_P$ may be selected so that a flame may not propagate from one side of the flameproof feed-through 300 to the other side with sufficient heat or energy content to cause ignition, given that a gap exists between the plug 325 and the interior surface of the passage 320.

Another flame path is the body height $H_B$. The body height $H_B$ comprises the height from the first flange portion 312 to the top of the body 305. In some embodiments, the body height $H_B$ is of a distance wherein a flame passing between the body 305 and the second component 500 will cool down and lose energy, wherein the flame cannot escape along the body height $H_B$.

The feed-through 300 further includes one or more conductors 328 extending through the plug 325. The plug 325 substantially blocks the passage 320 and prevents the exchange of gas, liquids, or other materials through the passage 320.

The one or more conductors 328 comprise any manner of electrical conductors. The one or more conductors 328 can comprise wires, cables, pins, shaped tongues, or any other desired conductor or conductor configuration. The one or more conductors 328 extend through the plug 325. Further, the one or more conductors 328 extend out of both sides of the plug 325 and extend at least partially to both the proximal end 301 and the distal end 302 of the feed-through 300. The one or more conductors 328 may transmit electrical signals between the proximal end 301 and the distal end 302 of the feed-through 300. The one or more conductors 328 may transmit electrical power between the proximal end 301 and the distal end 302.

The ends of the one or more conductors 328 available at the proximal end 301 are exposed to be electrically contacted or coupled. Similarly, the ends of the one or more conductors 328 available at the distal end 302 are likewise exposed to be electrically contacted or coupled. A first electrical connector (or similar device) may be assembled or affixed to the ends of the one or more conductors 328 available at the proximal end 301. A second electrical connector (or similar device) may be assembled or affixed to the ends of the one or more conductors 328 available at the distal end 302.

A first flange portion 312 and a second flange portion 314 may be formed on an exterior of the body 305 in some embodiment of the feed-through 300. The second flange portion 314 may have a circumference or perimeter that is equal to or different from the first flange portion 312. The first flange portion 312 and the second flange portion 314 are separated by a reduced diameter portion 313. The reduced diameter portion 313 has a smaller circumference or perimeter than either the first flange portion 312 or the second flange portion 314.

The reduced diameter portion 313 may be located at the proximal end 301 of the feed-through 300 (i.e., the first flange portion 312 may be reduced to a minimal size). Alternatively, the reduced diameter portion 313 may be located at the distal end 301 (i.e., the second flange portion 314 may be reduced to a minimal size). Further, the reduced diameter portion 313 may be located anywhere in between the proximal end 301 and the distal end 302.

Figure 4:
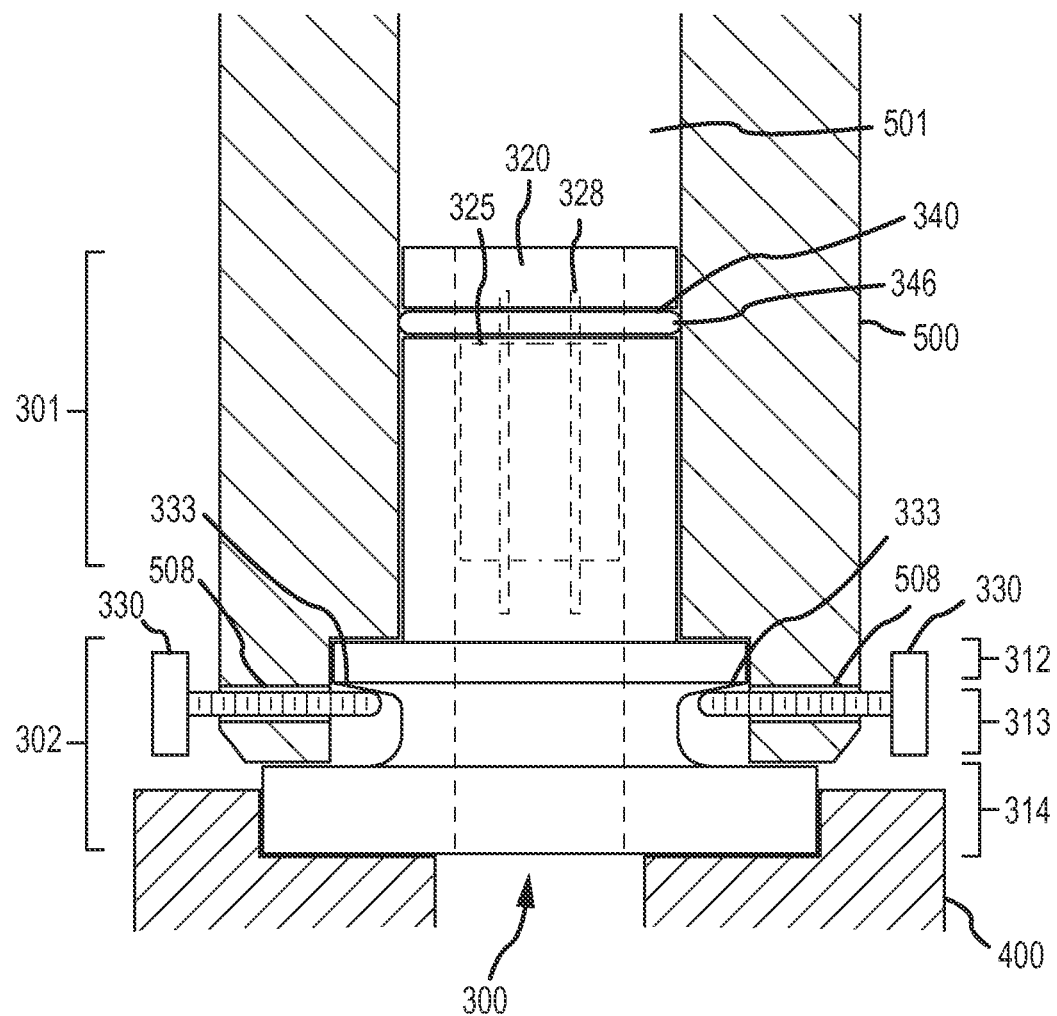
FIG. 4 shows the feed-through with a second component in position and affixed to the feed-through and a first component.

The reduced diameter portion 313 is configured to receive an end of one or more projecting fasteners 330 (see FIG. 4). The one or more projecting fasteners 330 may be manipulated to project into, or farther into, the reduced diameter portion 313. Alternatively, the one or more projecting fasteners 330 may be manipulated to project less into the reduced diameter portion 313. As a result, the one or more projecting fasteners 330 hold the second component 500 in position on the feed-through 300. A benefit of the design of the feed-through 300 is that the one or more projecting fasteners 330 may be loosened in order to allow the second component 500 to be rotated. Further, the one or more projecting fasteners 330 may allow the removal of the second component 500 from the feed-through 300.

The one or more projecting fasteners 330 may comprise threaded fasteners in some embodiments, such as threaded screws or threaded bolts, for example. However, other fasteners are contemplated and are within the scope of the description and claims. For example, the one or more projecting fasteners 330 may comprise shaped devices or spring devices that snap into place.

Where multiple projecting fasteners 330 are used, the multiple projecting fasteners 330 provide a strong retention device. The multiple projecting fasteners 330 provide a stable attachment interface. The multiple projecting fasteners 330 provide redundancy. The multiple projecting fasteners 330 provide resistance to vibration and uneven loads on the attachment interface.

Any number of projecting fasteners 330 may be employed. The one or more projecting fasteners 330 do not require complete removal in order to loosen and adjust the rotational positions between the first component 400 and the second component 500.

The sidewall 333 may be substantially planar. Alternatively, the sidewall 333 may be curved or may comprise multiple concurrent surfaces (i.e., the sidewall 3333 may comprise multiple surface portions of differing angles).

In some embodiments, the reduced diameter portion 313 includes at least one substantially vertical sidewall 333. Here, vertical means essentially perpendicular to a central axis, i.e., extending substantially radially outward.

In some embodiments, the reduced diameter portion 313 includes at least one angled sidewall 333. In the angled sidewall embodiment, the one or more projecting fasteners 330 engage the at least one angled sidewall 333, with the at least one angled sidewall 333 generating an engagement force on the second component when the one or more projecting fasteners 330 are manipulated to project into the reduced diameter portion 313. The reduced diameter portion 313 may include a sharp corner or corners, or may include curved or smoothed transitions.

In some embodiments, the projecting fasteners 330 may have a cone tip comprising a substantially conical or curved conical shape. In some embodiments, the projecting fasteners 330 may have a cone tip comprising a substantially conical or curved conical shape that substantially matches an angle of the sidewall 333. The matched angle maximizes the contact surface of the fastener relative to the sidewall 333 and may improve the rotational security of the attachment interface. In addition, the matched angle may more evenly distribute forces between the components.

External access is available to the one or more projecting fasteners 330. As a result, one or both of the first component 400 and/or the second component 500 may be rotated and/or rotatably positioned. The feed-through 300 advantageously does not require small assembly tolerances. The feed-through 300 advantageously is self-aligning. The feed-through 300 advantageously will pull the attachment interface together as the one or more projecting fasteners 330 are manipulated to project as far as possible into the reduced diameter region 313. The feed-through 300 advantageously is inexpensive. The feed-through 300 is simple and easy to operate. The feed-through 300 can be easily retrofitted to an existing device or devices.

FIG. 4 shows the feed-through 300 with the second component 500 in position and affixed to the feed-through 300 and the first component 400. The second component 500 may include a passage or receptacle 501 that fits over the proximal end 301 of the feed-through 300. The second component 500 in some embodiments may extend down over at least a portion of the distal end 302 of the feed-through 300. The second component 500 may contact the second flange portion 314 in the embodiment shown. A seal 346 may be positioned in the seal groove 340 and may sealingly contact the interior surface of the passage or receptacle 501. The seal 346 may comprise an O-ring in some embodiments, but may comprise any suitable seal.

The second component 500 may further include one or more fastener bores 508 that extend through a lower portion. The one or more fastener bores 508 may be threaded bores in some embodiments. One or more projecting fasteners 330 may be installed into the one or more fastener bores 508, such as by screwing the one or more projecting fasteners 330 into the one or more fastener bores 508.

The one or more projecting fasteners 330 may be manipulated to pass through the one or more fastener bores 508 and project into the reduced diameter portion 313. Consequently, the one or more projecting fasteners 330 may engage a portion of the reduced diameter portion 313, holding the second component 500 in place on the feed-through 300.

Further, the reduced diameter portion 313 may include an angled sidewall 333, as shown, wherein the engagement of the one or more projecting fasteners 330 with the reduced diameter portion 313 and the angled sidewall 333 serves to pull the second component 500 down and into substantially complete contact (or substantially complete engagement) with the feed-through 300. In some embodiments, the contact is with the upper surface of the second flange portion 314.

The tips of the one or more projecting fasteners 330 may contact and interact with the reduced diameter portion 313, wherein increasing projection of the one or more projecting fasteners 330 into the reduced diameter portion 313 creates a downward force on the second component 500, pulling the second component 500 down and onto complete engagement with the feed-through 300. In addition, a frictional contact will exist between the one or more projecting fasteners 330 and the angled sidewall 333.

It can be seen that the one or more projecting fasteners 330 may have rounded tips or tips of any desired shape. Alternatively, the tips of the one or more projecting fasteners 330 may be conical, tapered, or of any desired shape.

It can be seen from the figure that the bottom surface of the second component 500 contacts the upper surface of the second flange portion 314. The engagement of the one or more projecting fasteners 330 with the reduced diameter portion 313 and the sidewall 333 will bring the second component 500 down into contact with the second flange portion 314. The stability of the second component 500 is increased due to the contact, wherein the contact area is farther outward than the contact of the fasteners 330 with the sidewall 333. It should be understood that the tolerances between the second component 500 and the first flange portion 312 may be designed so that the second component 500 does not contact the first flange portion 312.

Figure 5:
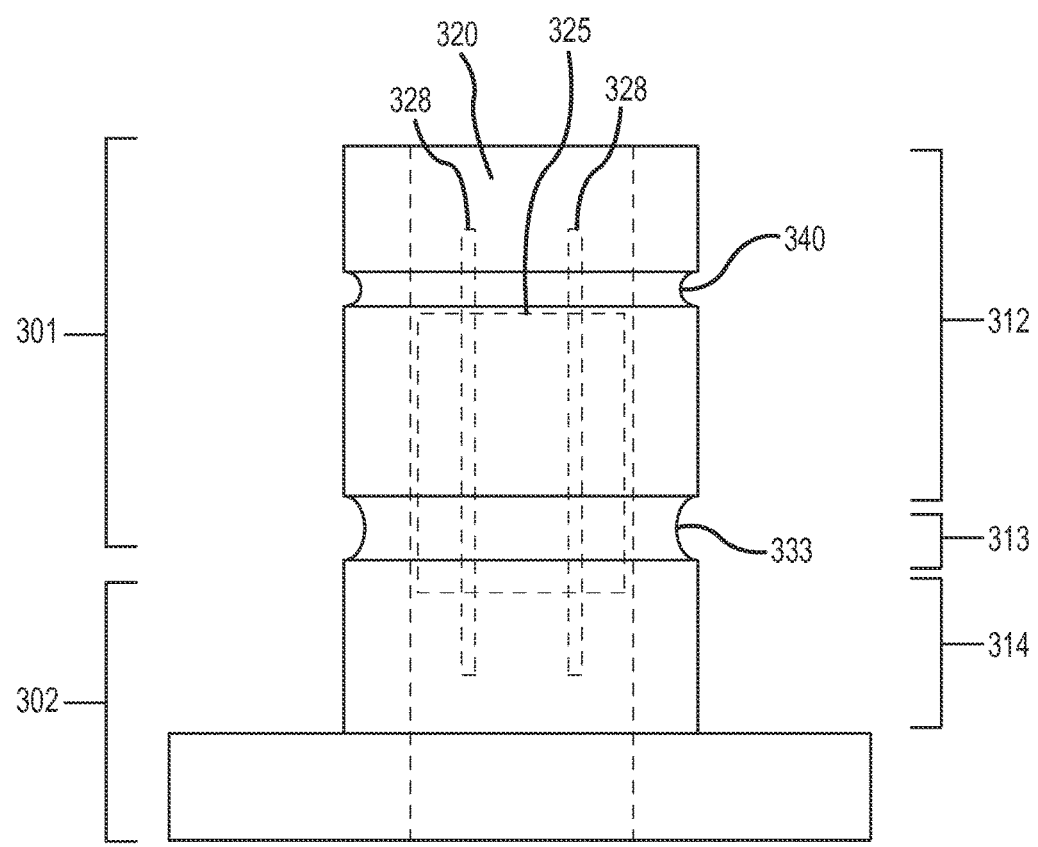
FIG. 5 shows the feed-through according to an embodiment of the invention.
Figure 5:
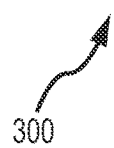

A frictional contact may be generated between the second component 500 and the second flange portion 314. Upon rotation of the second component 500, a frictional force is generated, wherein the frictional force opposes rotation of the second component 500. It should be understood that the frictional contact between the one or more projecting fasteners 330 and the sidewall 333 will also operate to oppose any rotation of the second component 500. FIG. 5 shows the feed-through 300 according to an embodiment of the invention. The feed-through 300 in this embodiment includes the first flange portion 312, the reduced diameter region 313, and the second flange portion 314. However, in this embodiment, the reduced diameter region 313 is cut, turned, cast, or otherwise formed in the feed-through 300. The first flange portion 312 and the second flange portion 314 may be of equal size, as shown, or may differ in size. However, the reduced diameter region 313 is smaller in size (or diameter), wherein the one or more projecting fasteners 330 may project into and engage the reduced diameter region 313 to hold the second component 500 in place on the feed-through 300.

In this embodiment, there is no distinct sidewall or sidewalls, and the reduced diameter portion 313 comprises a single smooth sidewall 333 that transitions from the first flange portion 312 to the second flange portion 314. In this embodiment, the sidewall 333 comprises a smooth, arcuate depression. However, it should be understood that any desired shape and size may be employed for the reduced diameter portion 313.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Accordingly, the scope of the invention should be determined from the following claims.

What is claimed is:

1. A feed-through (300), comprising:
   a body (305) including a passage (320);

a plug (325) located in and substantially blocking the passage (320);

one or more conductors (328) extending through the plug (325); and a first flange portion (312) located on the exterior surface of a proximal end (310) of the body (305);

a second flange portion (314) located on a proximal end (310) of the exterior surface;

a reduced diameter region (313) located on an exterior surface of the body (305) between the first flange portion (312) and second flange portion (314), with the reduced diameter region (313) being adapted to receive ends of one or more projecting fasteners (330) of a second component.

2. The feed-through (300) of claim 1, wherein the feed-through (300) is configured to be removably or permanently affixed to a first component and wherein the feed-through (300) couples the second component to the first component.

3. The feed-through (300) of claim 1, wherein the one or more projecting fasteners (330) of the second component engage the reduced diameter region (313) in order to pull the second component into full engagement with the feed-through (300).

4. The feed-through (300) of claim 1, wherein the reduced diameter portion (313) includes at least one substantially vertical sidewall (333).

5. The feed-through (300) of claim 1, wherein the reduced diameter portion (313) includes at least one angled sidewall (333).

6. The feed-through (300) of claim 1, wherein the reduced diameter portion (313) includes at least one angled sidewall (333) and wherein the one or more projecting fasteners (330) engage the at least one angled sidewall (333), with the at least one angled sidewall (333) generating an engagement force on the second component when the one or more projecting fasteners (330) are manipulated to project into the reduced diameter portion (313).

7. The feed-through (300) of claim 1, wherein the reduced diameter portion (313) includes at least one angled sidewall (333) including a sidewall angle that substantially matches a tip angle of the one or more projecting fasteners (330).

8. The feed-through (300) of claim 1, wherein the plug (325) is formed of one or both of an electrical insulator material or a thermally-resistant material.

9. The feed-through (300) of claim 1,
wherein the reduced diameter region (313) is smaller than the first flange portion (312).

10. The feed-through (300) of claim 9, wherein the feed-through (300) operates to pull the second component down and into frictional contact with the second flange portion (314) of the feed-through (300).

11. A method of forming a feed-through, with the method comprising:

providing a body including a passage;

providing a plug located in and substantially blocking the passage;

providing one or more conductors extending through the plug;

providing a first flange portion located on the exterior surface of a proximal end of the body;

providing a second flange portion located on a proximal end of the exterior surface; and providing a reduced diameter region located on an exterior surface of the body between the first flange portion and second flange portion, with the reduced diameter region being adapted to receive ends of one or more projecting fasteners of a second component.

12. The method of claim 11, further comprising removably or permanently affixing the feed-through to a first component.

13. The method of claim 11, further comprising removably or permanently affixing the feed-through to a first component and coupling the second component to the first component with the feed-through.

14. The method of claim 11, further comprising removably or permanently affixing the feed-through to a first component and coupling the second component to the first component with the feed-through, wherein the one or more projecting fasteners of the second component engage the reduced diameter region in order to pull the second component into full engagement with the feed-through.

15. The method of claim 11, wherein the reduced diameter portion includes at least one substantially vertical sidewall.

16. The method of claim 11, wherein the reduced diameter portion includes at least one angled sidewall.

17. The method of claim 11, wherein the reduced diameter portion includes at least one angled sidewall and wherein the one or more projecting fasteners engage the at least one angled sidewall, with the at least one angled sidewall generating an engagement force on the second component when the one or more projecting fasteners are manipulated to project into the reduced diameter portion.

18. The method of claim 11, wherein the reduced diameter portion includes at least one angled sidewall including a sidewall angle that substantially matches a tip angle of the one or more projecting fasteners.

19. The method of claim 11,
wherein the reduced diameter region is smaller than the first flange portion.

20. The method of claim 19, wherein the feed-through operates to pull the second component down and into frictional contact with the second flange portion of the feed-through.

* * * * *